(12) United States Patent
Alonso (10) Patent No.: US 11,809,333 B2
(45) Date of Patent: Nov. 7, 2023

(54) EVICTION MECHANISM

(71) Applicant: Microsoft Technology Licensing, LLC, Redmond, WA (US)

(72) Inventor: Julio Gago Alonso, Barcelona (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/755,271

(22) PCT Filed: Nov. 5, 2019

(86) PCT No.: PCT/EP2019/080172
§ 371 (c)(1),
(2) Date: Apr. 25, 2022

(87) PCT Pub. No.: WO2021/089117
PCT Pub. Date: May 14, 2021

(65) Prior Publication Data
US 2022/0391325 A1  Dec. 8, 2022

(51) Int. Cl.
*G06F 12/123* (2016.01)
*G06N 10/40* (2022.01)
(52) U.S. Cl.
CPC ........... *G06F 12/123* (2013.01); *G06N 10/40* (2022.01); *G06F 2212/1056* (2013.01)
(58) Field of Classification Search
None
See application file for complete search history.

(56) References Cited

U.S. PATENT DOCUMENTS

| | | |
|---|---|---|
| 6,496,912 B1 | 12/2002 | Fields, Jr. et al. |
| 2007/0156964 A1 | 7/2007 | Sistla |
| 2017/0116118 A1* | 4/2017 | Artieri ................ G06F 12/0895 |
| 2017/0300418 A1* | 10/2017 | Reed ...................... G06F 12/128 |
| 2018/0300258 A1* | 10/2018 | Wokhlu .............. G06F 12/0862 |

OTHER PUBLICATIONS

Dorojevets et al., "Fast Pipelined Storage for High-Performance Energy-Efficient Computing with Superconductor Technology," *15 12th International Conference & Expo on Emerging Technologies for a Smarter World (CEWIT)*, 6 pp. (2015).
International Search Report and Written Opinion dated Aug. 4, 2020 from International Patent Application No. PCT/EP2019/080172, 16 pp.
"Line Replaceable Unit Control Mechanism for Cache Memories," *IBM Technical Disclosure Bulletin*, vol. 40, No. 5, 2 pp. (May 1997).

\* cited by examiner

*Primary Examiner* — Edward J Dudek, Jr.
*Assistant Examiner* — Ralph A Verderamo, III
(74) *Attorney, Agent, or Firm* — Klarquist Sparkman, LLP

(57) ABSTRACT

A device comprising: storage comprising a group of partitions, and a controller operable to place data into a selected one of the partitions, and to evict existing data from the selected partition when already occupied. The eviction is performed according to an eviction policy. According to this, each partition has an associated age indicator, each age indicator is operable to cycle through a sequence of J steps. Each age indicator is able to run ahead of the current oldest age indicator, but only as long as the age indicators of all the partitions in the group, between them, form a consecutive run of no more than K consecutive steps in the sequence, where K<J−1. The selected partition for eviction is one of the partitions in the group with the oldest age indicator.

20 Claims, 4 Drawing Sheets

EVICTION MECHANISM

CROSS REFERENCE TO RELATED APPLICATIONS

This is the U.S. National Stage of International Application No. PCT/EP2019/080172, filed Nov. 5, 2019, which was published in English under PCT Article 21(2), and which is incorporated by reference herein in its entirety.

BACKGROUND

A cache is a relatively small, fast region of storage arranged to reduce the time required to load data that would otherwise need to be retrieved from memory. When a processor performs a memory access operation to load data from memory, it first checks whether the requested data is found in the cache. If so, it retrieves the requested data from the cache instead of the memory. This is referred to as a cache hit. If on the other hand the requested data is not found in the cache (a cache miss), then it is retrieved from memory instead. In this case, the data retrieved from memory is also now placed in the cache (i.e. the data is "cached") in order to be able to retrieve it from the cache next time. The cache is quicker to access than the main memory, because it is smaller in size and therefore has simpler addressing logic, and typically also because it is located physically closer to the execution unit than the memory. The more often that requested data is found in the cache (i.e. the higher the ratio of cache hits to misses), the faster it will be to access data on average.

Various caching policies have been developed over the years to try to improve the cache hit rate. However, the design of the algorithm is a trade-off between hit ratio, complexity and cache access time.

A cache is typically divided into a plurality of partitions. For instance in a direct mapped cache, the cache is divided into a plurality of cache lines, each associated with the specific address range of a specific block of memory. When some data is cached from the memory, it must be placed into its corresponding cache line and any previous data in that line is evicted. When the processor requests to retrieve data, it need only check the one cache line associated with the address of the requested data. This scheme has a low complexity to implement and a fast cache access time, but it also results in a relatively low cache hit rate. In a fully associative cache on the other hand, a block of data from memory can be cached into any of the cache lines. This results in a higher cache hit rate. However, it also means that all of the cache lines need to be checked with each memory access operation in order to determine whether the requested data is already found in the cache, thus incurring a higher complexity and slower cache access time. A set-associative cache is a trade-off between a direct mapped cache and a fully associative cache. In a set-associative cache, the cache is divided into a plurality of "sets" and each set is subdivided into a plurality of "ways". The sets can be thought of like rows and the ways can be thought of like columns. Each set is associated with a specific address range in memory, and data from that address range can be cached into any of the ways within the respective set. Thus to search for a cache hit for a given piece of requested data, it is only required to check each of the ways within a given set.

Associative caches—both fully associative and set-associative—will require an eviction policy (also called a replacement policy) in order to determine which partition to evict existing data from when all suitable partitions for a newly loaded piece of data are already full. In the case of a fully associative cache, this means determining which line to evict when the cache as a whole is full (i.e. all lines are already occupied). In the case of a set-associative cache, this means deciding which way within the relevant set to evict when the set is full (i.e. all ways in the set are already occupied). To facilitate the eviction policy, a piece of age information (sometimes also called the "status") is associated with each partition (each line in the case of a fully associative cache, or each way in the case of a set-associative cache). This is a measure of when the respective associated partition was last accessed, either to place the current data into the cache or subsequently read that data from the cache. The eviction algorithm will typically select to overwrite the partition that was least recently accessed according to the age indicator values. For instance in the case of a fully associative cache, a cache line with the oldest age indicator will be evicted. In the case of a set-associative cache, a way with the oldest age indicator within the relevant set will be evicted.

However, the choice of eviction policy is also a trade-off between complexity and cache hit rate. For instance, one type of eviction policy is known as LRU (least recently used). In this case the age information will always keep track of exactly which partition was the least recently used, i.e. which line in the case of a fully associative cache, or which way within the set in the case of a set-associative cache. This means the algorithm is entirely determinative in that there will only ever be one single LRU partition to select according to the age information in any given scenario. This has the highest cache hit rate but also incurs the greatest complexity to implement due to the high granularity of the era values. An alternative is known as pseudo-LRU. In this case the age information records only an approximate measure of age rather than maintaining the exact age of every partition relative to one another in the group (the whole cache in the case of a fully associative cache, or the set in the case of a set-associative cache). This means that at any given time, there could be two or more partitions within the group that share the same age value. Hence when it comes to evict one of the partitions, then any of the partitions sharing the oldest age value within the group may be selected. This has a lower cache hit rate than true LRU, but also a lower complexity and is usually considered good enough.

SUMMARY

However, an issue with both true LRU and pseudo-LRU is that, for at least some cache access operations, they require the age value of multiple partitions in a group (e.g. multiple ways in a set) to be updated upon a given one cache access operation accessing a given one of the partitions. This is done due to the need to record the age of the partition relative to the other partitions in the group.

For instance consider a 1-bit pseudo LRU scheme for a set-associative cache. Each way within a set has a 1-bit age indicator, and at start-up the age indicators are initialized to zero. When a first way is accessed, its age indicator bit is updated to 1. When the next way is accessed then its age indicator is updated to 1 as well, and so forth. However when the last way within the set is accessed, all the age indicators of all the ways are reset to zero again. This requires updating all the age values of all the ways in the set for just a single cache access operation to a single way. A similar issue will also sometimes occur in systems that use higher granularity (multi-bit) age indicators per way, or more generally per partition of the cache.

It is recognised herein that this has a complexity cost which it would be desirable to avoid.

The present disclosure provides an eviction policy that only ever requires updating the age value of only one partition in any one cache access operation at a time.

A cache is a typical case which would benefit from this, but other structures with the concept of partitions or ways and the concept of aging and replacement could also benefit from the disclosed mechanism, e.g. branch predictors and other structures in a processor or other types of device.

According to one aspect disclosed herein, there is provided a device comprising: storage comprising a group of partitions, and a controller operable to place data into a selected one of the partitions, and to evict existing data from the selected partition when already occupied. Each of the partitions has a respective associated age indicator. The controller is configured to select said one of the partitions according to an eviction policy as follows.

Each age indicator is operable to cycle through a sequence of J steps. Further, each age indicator is allowed to run ahead of the current step O of an oldest age indicator in the group, wherein the oldest age indicator is that of the partition that was least recently accessed amongst the partitions in the group. However, they are only allowed to run ahead subject to two constraints: i) each age indicator is allowed to run up to, but no more than, K steps in the series ahead of O where K<J−1 (i.e. each can run up to O+K modulo J but no further), and ii) the age indicators of all the partitions in the group must, between them, always continue to form a run of consecutive steps in the series.

In other words, each age indicator is able to run ahead of O but only as long as the age indicators of all the partitions in the group, between them, form a consecutive run of no more than K consecutive steps in the sequence.

When one of the partitions in the group is accessed, its respective age indicator is incremented by an increment of one or more steps in the series if the respective age indicator will still satisfy both said constraints i) and ii), wherein said increment is sized such that the run still meets both said constraints i) and ii) after the incrementing.

However, if or when one of the partitions in the group is accessed but its respective age indicator will not satisfy both said constraints i) and ii) after being incremented, then the respective age indicator remains unchanged.

In other words, when one of the partitions is accessed, then its respective age indicator is incremented only if, and to the maximum extent that, the age indicators of all the partitions in the group, between them, continue to form a consecutive run of no more than K consecutive steps in the sequence immediately following the incrementation. In embodiments, when one of the partitions is accessed, the respective age indicator is incremented to the newest (furthest ahead) possible step in the sequence that still meets these conditions (i.e. still forms a consecutive run of no more than K consecutive steps). Alternatively the increment could be a fixed-size increment of one step.

The selected partition for eviction is one of the partitions in the group with age indicator currently at step O.

In embodiments, the steps may be a sequence of binary values, e.g. 00, 01, 10 and 11 for a 2-bit age value. Where it is said that the age value cycles through the series of J steps, this means in a cyclical (wrap-around) manner. I.e. once the age goes past the last (Jth) step (e.g. 11), it starts again back at the first step (e.g. 00). In embodiments for example, J=4 and K=2.

The number of steps that any one partition (e.g. way) can run ahead of the oldest era O is constrained to being at least two less than the number of steps J in the cycle. Thus there is always a buffer of at least one unused age indicator value (not currently used by any of the partitions) in-between the newest value and the oldest value, counting in the direction from newest onwards around the cycle back to oldest. In addition, the age indicator values that are currently in use are constrained to forming a continuous run of values. Together, these two constraints mean that it is always possible to differentiate between the current oldest and newest age value, without needing to update the age indicators of other partitions (e.g. ways) at the time of any given cache access operation in order to represent the age of the accessed partition (e.g. way) relative to the others in the group (e.g. set). I.e. by imposing the requirement to be at least one less than J and keep no unused eras in the middle, then the unused age indicator acts as a partition to delineate which is the oldest age value (unused+1) and which is the youngest (unused−1).

In the simplest case, K=1 so there are only ever two consecutive age indicator values in use at any one time. This is a particular case that meets the general requirements by leaving at least two unused age indicator values all the time. In other embodiments K>1, in which case richer age information can be maintained, thus improving the chance that the LRU way or partition picked for eviction is actually the oldest (i.e. that it is actually the least recently accessed).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
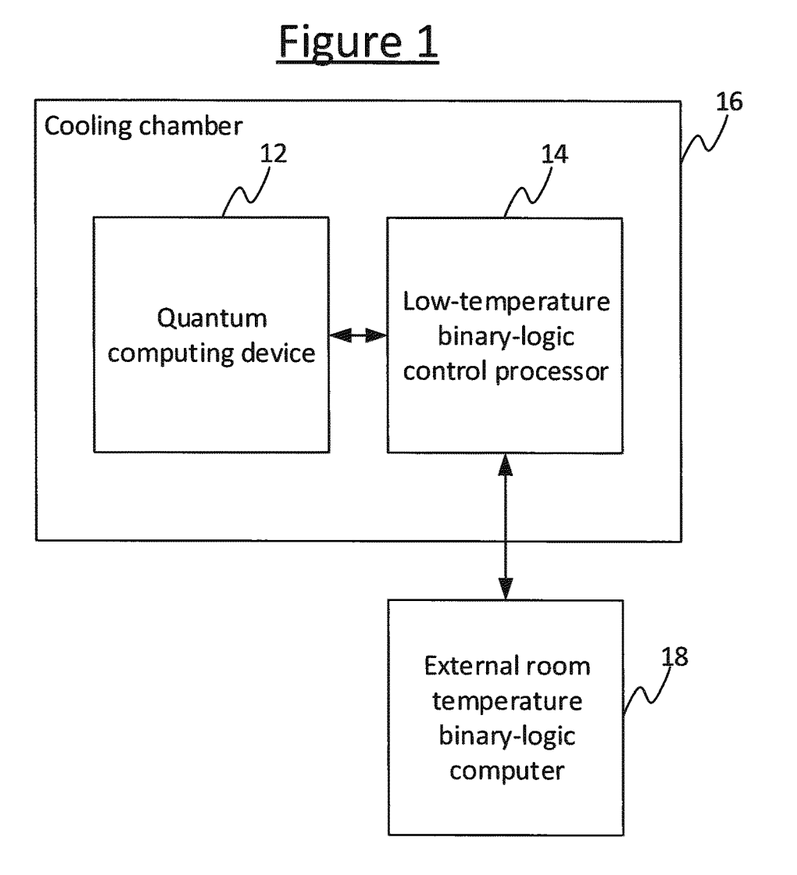
FIG. 1 is a schematic block diagram of a system comprising a processor.

FIG. 1 shows an example system in which the techniques disclosed herein may be employed. The system comprises a quantum computing device 12, comprising quantum logic that employs one or more quantum bits (qubits) in order to perform computations. A qubit is an element which, when not being measured, can exist in a probabilistic supposition of two quantum states. When measured, a particular one of those states will be observed depending on the relative probabilities. To operate, the quantum computing device 12 is required to be cooled to cryogenic temperatures, typically below 10 Kelvin, where one or more superconducting components in the quantum computing device 12 exhibit superconducting behaviour.

The quantum computing device 12 may take the form of a topological quantum computing device. For instance, one such device comprises a network of semiconductor-superconductor nanowires. Each nanowire comprises a length of semiconductor formed over a substrate, and a coating of superconductor formed over at least part of the semiconductor. When cooled to superconducting temperatures, the superconductor induces superconducting behaviour in a region of the semiconductor near the interface between the semiconductor and the superconductor. Further, a magnetic field is applied, either from an external magnet or a ferromagnetic material built into the device 12. The nanowire is typically also gated with an electrostatic potential. These conditions invoke a "topological regime" in the superconducting region (topological region) of the semiconductor. This refers to the regime in which Majorana zero modes (MZMs) form in the topological region. An MZM is a particular state of a type of quasiparticle known as a Majorana. It is these MZMs which can be manipulated in order to form one or more qubits.

In order to reach temperatures low enough that the topological regime can be induced, the quantum computing device 12 is placed inside a cryogenic cooling chamber 16 and thereby cooled to the required temperature. In order to be able to manipulate and read out the qubits, a binary-logic (i.e. digital) control processor 14 needs to connected to the quantum computing device 12. The control processor 14 has to be physically close to the quantum computing device 12 because of the need for fast communication with the quantum computing device. This means the control processor 14 has to be placed inside the cooling chamber 16 along with the quantum computing device 12.

However, conventional digital logic such as CMOS (complementary metal-oxide-semiconductor) does not work well at cryogenic temperatures. Hence what is needed is a processor 14 which employs conventional binary (i.e. digital) computation, but which operates at cryogenic temperatures (for the present purpose meaning superconducting temperatures). Hence the control processor 14 is built from a class of logic architecture referred to as superconducting logic, e.g. RQL (Reciprocal Quantum Logic). This is a class of logic which instead of using transistors, instead uses the superconducting properties of materials in order to represent otherwise-conventional binary digits (bits).

This low-temperature control processor 14 is also connected via an external connection to a classical room-temperature computer 18 located externally to the cooling chamber 16. This could be any binary-logic (i.e. digital) computer built from any conventional logic architecture, e.g. CMOS. The control processor 14 thus acts as an interface between the quantum computing device 12 inside the chamber 16 and the room-temperature computer 18 outside of the chamber 16. The control processor 14 is arranged to manipulate one or more of the qubits in the quantum computing device 12 based on inputs received from the external computer 18, and to output readouts to the external computer 18 based on readings sampled from one or more of the qubits of the quantum computing device 12. Alternatively or additionally, the control processor 14 may take readings from the quantum computing device 12 which it uses internally to the control processor 14, and may manipulate the quantum computing device 12 autonomously for at least some purposes, e.g. to regulate or tune the operation of the quantum computing device 12.

More generally, the device 12 could represent any quantum device, spintronic device or other superconducting device which operates at superconducting temperatures, and which requires a low temperature digital control processor 14 to be included along with it in the same cryogenic chamber 16. More generally still, the techniques disclosed herein are not limited to use in a low temperature control processor 14, and they could also be employed in a conventional room temperature logic architecture such as CMOS. However, as will be discussed shortly, the presently disclosed techniques have a particular (but not exclusive) advantage in a superconducting logic architecture such as RQL where a higher complexity cache implementation comes at a higher cost than in conventional logic such as CMOS or the like.

Figure 2:
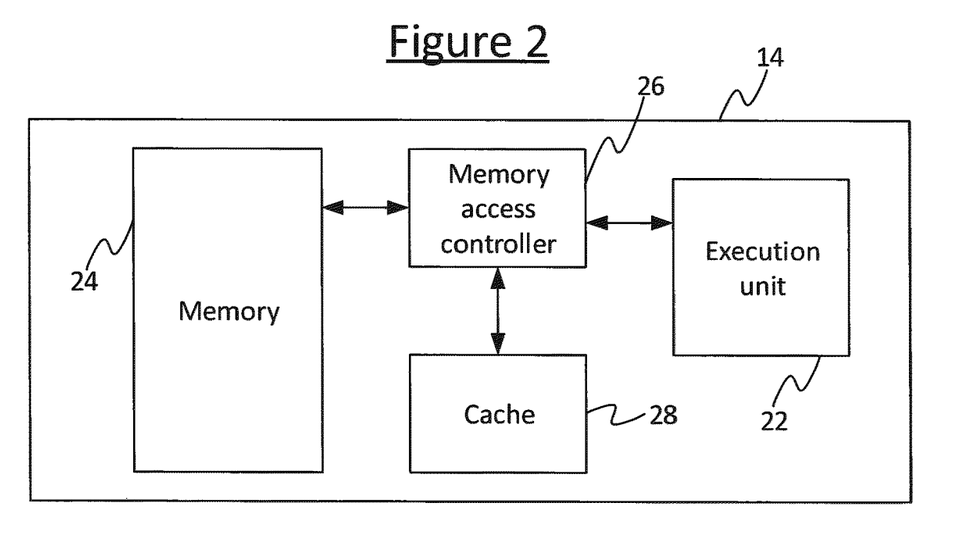
FIG. 2 is a schematic block diagram of a processor comprising a cache.

Whatever its application, the processor 14 comprises a plurality of components as illustrated in FIG. 2. The processor 14 comprises an execution unit 22, a memory 24, a memory access controller 26, and a cache 28. The execution unit 22 here represents the logic involved in executing instructions. It may comprise a fetch unit, decode unit, load/store unit, arithmetic logic unit (ALU) and/or floating point unit (FPU), etc. In embodiments the execution unit 12 may take the form of an execution pipeline. The memory 24 comprises one or more memory units. It is illustrated here as being integrated with the rest of the processor 14 (i.e. on the same chip). However in alternative implementations it could be implemented externally on a different chip, or could comprise a combination of internal and external memory units.

The cache 28 is arranged as a temporary store of recently used data. It has a smaller storage capacity than the memory 24, and is typically also located physically closer to the execution unit 22. This makes the cache 28 faster to access than the memory 24. The execution unit 22 is arranged to execute a program comprising a sequence of instructions, including one or more load instructions. When a load instruction is executed, it causes the execution unit 22 to request data to be loaded into the execution unit 22 from a specified or address range of the memory 24. The memory access controller 26 is arranged to determine whether the requested data is in fact already found in the cache 28. If so, it will return the requested data to the execution unit 22 from the cache 28 instead of from the memory 24 (a cache hit). If on the other hand the requested data is not found in the cache 28, the memory access controller 26 will return the data to the execution unit 22 from the memory 24 (a cache miss). Upon doing this, the memory access controller 26 will also now cache the requested data into the cache 28 so as to make that data available in the cache 28 for the next time it is requested. The memory access controller 26 also implements the necessary eviction policy, for overwriting existing data in the cache when new data needs to be cached.

The cache 28 may be an associative cache, either a fully associative cache or a set-associative cache. Either way, the cache 28 is divided into a plurality of partitions. Each partition can only hold the data from one load operation at a time. When all of the partitions suitable for caching a given piece of requested data are full (i.e. already occupied), then one of those partitions will need to be evicted to make space for the new data. This is the role of the eviction policy.

Figure 3:
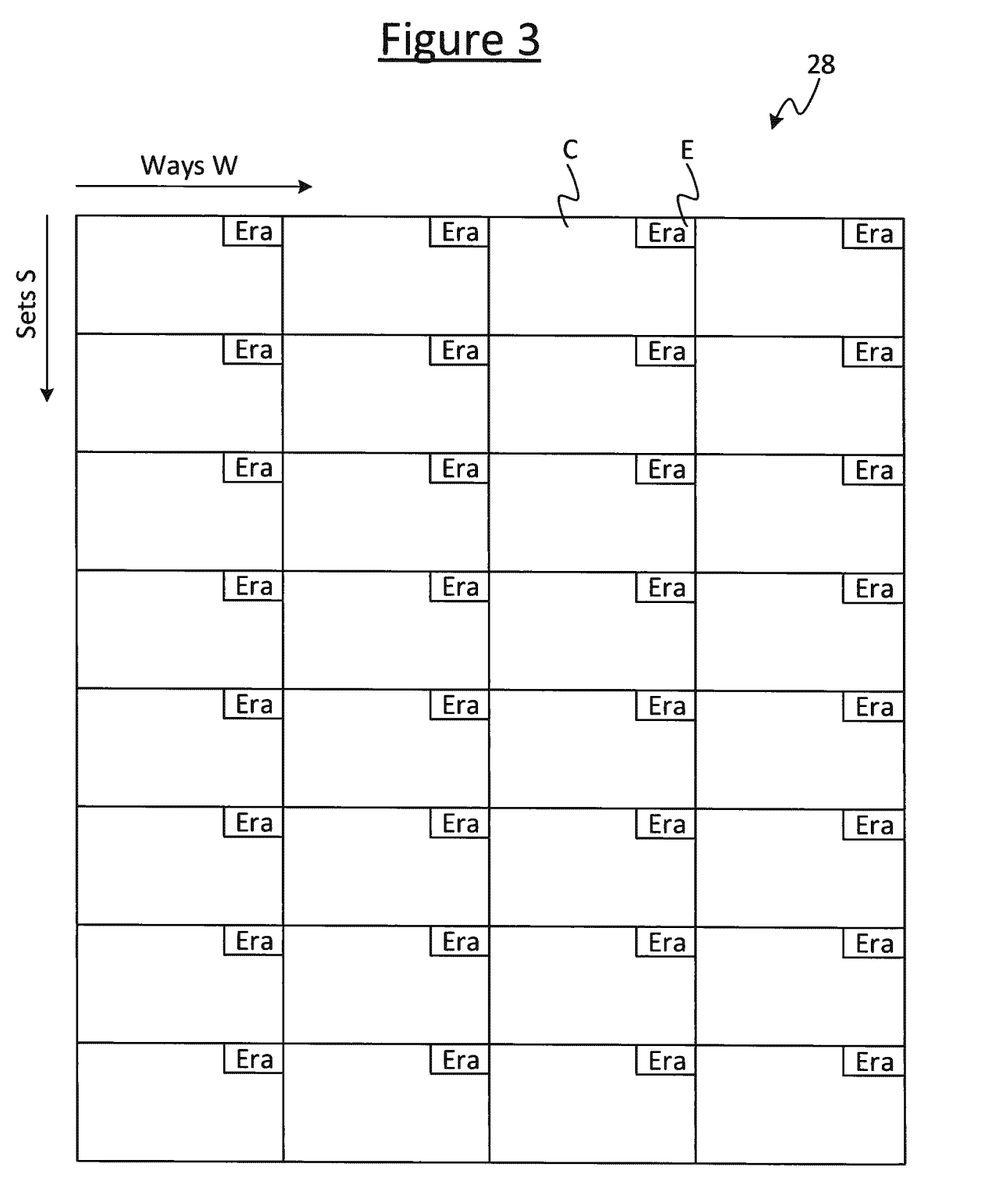
FIG. 3 is a schematic block diagram of an associative cache.

FIG. 3 shows an example of a set-associative cache which may be used to illustrate principles of embodiments disclosed herein. In this case the cache 28 is divided into a plurality of sets S, and each set S is subdivided into a plurality of ways W. The sets S may be thought of like rows and the ways W may be thought of like columns. In the example illustrated there are eight sets each divided into four ways. However it will be appreciated that the cache 28 could comprise other numbers of sets S and/or the sets could be subdivided into a different number of ways W. E.g. in other embodiments there could be sixteen, thirty-two or sixty four sets S or more; and/or two, eight or sixteen ways W or more per set S.

Each set S is associated with a different respective block of address space corresponding to a different respective region in the memory 24. When a portion of data is cached, the memory access controller 26 places it in one of the ways W of the set S that is associated with the address of the requested data. When the execution unit 22 requests to load data, the memory access controller 26 first checks whether that data can be found in any of the ways W of the respective set S associated with the address of the requested data. If so it retrieves the requested data from that way W of the cache 28 instead of from the memory 24 (a cache hit). Otherwise it retrieves the data from memory 24 and also caches the data into one of the ways W of the respective set.

Each way W can only hold the data loaded by one load operation at any one time. Hence if previously cached data is already held in all of the ways W of the relevant set S needed for a newly requested piece of data, then the memory access controller 26 will need to select which of the ways W within that set S to evict to make room for the new data.

Each way W comprises a region C for storing the actual cached content (i.e. the data itself). In addition, each way W comprises an age indicator E which is a small binary (digital) value of one or more bit in size. The age indicator may be referred to herein as the "era". It could also be referred to as the "status". The eras E are preferably implemented in hardware bits of the cache 28, in hardware physically incorporated into the ways. In general the era may be contained either in the same physical structure as the data or in a different one, though the effect of the disclosed algorithm (specifically in its property of only needing to update one way at a time, discussed in more detail shortly) is more prominent when the era shares the same physical structure of the data and is distributed as the data.

The memory access controller 26 itself, including the caching functionality and eviction policy, may also be implemented in dedicated hardware circuitry. The eras E enable the memory access controller 26 to implement the eviction algorithm to determine which way W to evict at any given time. The era E acts as a piece of age information representing how long ago its respective way W was last accessed. "Accessed" here means either data being placed into the way W or data being retrieved from the way (or more generally data being placed into or retrieved from the respective partition).

As mentioned, one known eviction algorithm is pseudo-LRU. In this case the era E does not have fine enough granularity to always determine at any given time the exact order in which the ways W were last accessed, and therefore at any given time which individual one of the ways W was actually the least recently accessed. However, it is considered a sufficient approximation.

For instance, consider a one-bit pseudo-LRU algorithm where each era E is only a single bit. Initially all eras E in the set are initialised to 0. Then when the first way W is used, the memory access controller 26 toggles its era E to 1 in order to mark that it has been recently accessed. Then when the next piece of data comes to be cached in the same set S, the memory access controller 26 caches the data in one of the remaining ways W whose era E is still 0, then toggles that way's era E to 1, and so forth. When the era E of all the ways W in the set S are turned to 1, then the memory access controller 26 resets all of the eras E in the set S back to 0.

Thus in a set-way associative or fully-associative hardware structure, a replacement algorithm is used to select which entry in the structure to replace when new information needs to be placed. Usual existing replacement algorithms are either true-LRU (least recently used), or pseudo-LRU (pLRU) which tries to approach true-LRU performance with less cost. As discussed, replacement algorithms usually require the storage of a little bit of age information for each of the ways/entries of a particular set/structure. Furthermore, all existing replacement algorithms, as far as the inventor is aware, have situations in which the age information of all the ways/entries in a particular way/structure need to be updated at once. Sometimes, the underlying technology may make this costly, e.g. in the case of superconducting logic designed for use at cryogenic temperatures. For instance, when age information is integrated with other bits of information in the structure being used, like for instance a data cache, each update to age information may require updating the whole structure, for instance because bit-selectors are not available. The age information for each way or partition may be referred to herein as the era.

To illustrate, consider the above example of the 1-bit LRU algorithm. Once all the ways W in a set S become most recently used, MRU, (i.e. their eras E are all set to 1), then the eras E of all the ways W in the set S will need to be reset back to zero at once, in response to just a single cache access operation. So for instance, in the illustrated example of four ways W per set S, consider the scenario where three of the four ways W1 . . . W3 have MRU status (era value 1) and only one era W4 still has LRU status (era value 0). When the era E4 of W4 is then accessed, all the ways W1 . . . 4 will now have MRU status. To continue being useful, the policy then needs to reset all eras E1 . . . 4 back to LRU status (era value 0). So in response to accessing just one way W4, all the eras E1 . . . 4 need to be updated at once.

A similar issue will also occur for finer-granularity pLRU algorithms that use more than one bit per era value, all the way up to and including true LRU.

When an era value is updated, a read-modify-write operation is required in order to update the structure. Hence, when the algorithm requires updating age information for all the ways and each way requires a read-modify-write, this may have a high implementation cost in the form of logic and routing. The underlying technology may also make it expensive or infeasible to store "age" information separately from the main structure. In such conditions, a replacement algorithm that guarantees that only one way needs to be updated at any time may greatly reduce implementation cost.

For instance, in a superconducting logic architecture such as RQL, there is a relatively high complexity cost of implementing a read-modify-write across the eras of all ways W in a set S (e.g. the eras E1 . . . 4 of all four ways W1 . . . 4 in the example illustrated). In CMOS this complexity cost would be small and hence people may not have considered this issue in the past. However, for applications such as those discussed in relation to FIG. 1, employing RQL or other superconducting logic architectures, then the inventor has identified that the complexity cost of performing a modification across all ways W in a set is significant. And even for more conventional architectures such as CMOS, there will still be some non-negligible complexity cost which could be saved. E.g. this could be especially (but not exclusively) relevant for small size or low-power applications.

Hence the present disclosure provides a replacement algorithm (eviction algorithm) that only ever requires one update for each cache access operation.

The following gives one example for a four-way set-associative replacement algorithm with two bits of age information per era.

Initially, the era E used by all four ways W is "0", encoded as binary digits "00" (the current LRU).

When a given way W is accessed, then to make that way the most-recently-used (MRU), the era E of that way is switched to "01". If the way is accessed again while any other way still has era equal to 00, then the era of the accessed way will not be updated again but instead will remain at "01".

When all ways W in the set S have been accessed and thus have eras E now set to "01", then this is the new LRU, and the next MRU is marked by switching its era E to "10". I.e. when each of the ways is next accessed its era E is set to "10". But if accessed again before any of the others, it cannot progress beyond this while any other way still has era "01".

When all eras become "10", the next MRU is marked by switching its era E to "11". The MRU then cannot progress beyond this while any other era in the set is still "10".

When all eras become "11", the next MRU is marked by switching its era to "00". The MRU cannot progress beyond this while any other era in the set is still "11".

The process continues to repeat cyclically in this manner.

It can be seen that at any given time, all ways W in the set are only ever using one or two consecutive era values between them. This means it is always possible to distinguish between the LRU and MRU ways. The LRU (least recently used) way is picked by using the first entry using the "old era" of all the eras in use. E.g. that would be "00" when all eras in use are "00" or "01"; or it would be "01" when all eras in use are "01" or "10" and so on, with LRU being "11" when all eras in use are "11" or "00".

This algorithm only ever requires updating age information for one way on every access. It does require more bits per way than 1-bit pLRU to get the same functionality (2×). It also performs slightly worse than the 1-bit pLRU algorithm when all entries belong temporarily to the same era, if that happens, because at that time there is no age differentiation. This lasts only until the next access, and the inventor's performance experiments show no real impact, since pseudo-LRU algorithms are inexact by nature. On the whole, it is considered that these minor drawbacks are a good trade-off between good performance and implementation complexity for replacement algorithms, especially (but not exclusively) when the underlying technology has certain implementation restrictions such as in RQL technology.

The algorithm reduces the complexity compared to LSU or pseudo-LSU because the memory access controller 26 never has to modify more than one era at a time. It does still always need to compare the era being updated with all the other eras in the set, which would still need a read operation from each way. However the read is needed every time anyway, and avoiding the extra modify operations saves on additional complexity over and above this.

For instance, in a fully-associative or set-associative structure, one does not know where the data may be located in a given set S (it can be in any of the ways W). So all ways need to be read no matter what. Alternatively such ways could be read sequentially and the lookup stopped after the data being searched is found, but this is not usually done to avoid the performance penalty of serializing the operation.

Also to find a proper victim for eviction, one needs to read the age information for all the ways. However, the modification of all the ways is another matter. As demonstrated, normal replacement (eviction) algorithms may need to change all the age information at the same time. If the age information is kept physically separate from the actual cache data, then no data write is required and the complexity cost is relatively small (though not necessarily negligible). If the age information is kept together with the actual cache data in the same physical structure, then the complexity penalty is more expensive. It may require updating all the information in the structure, which is the data and the age, and the data needs to be read again in order to be written unmodified, hence a read-modify-write operation is required, which includes routing the data between the read port and the write port. Doing this for all the ways at the same time is much more expensive that doing that for only one way, the one that is being modifying in any case.

It will be appreciated of course that the above-described algorithm could be extended to more than four ways W per set S.

As another, alternative or additional extension, the MRU may be allowed to run more than one step ahead of the LRU. As long as there are always at least one step between the MRU to the LRU in the direction counting beyond the MRU and cycling back to the LRU, and as long as the eras from LRU to MRU still form a consecutive run within the sequence of possible values, then it will still always be possible to distinguish between the MRU and the LRU.

The algorithm may be generalized as follows.

Each way W has an associated era E which cycles from 0 to J−1, or more generally through J different values or steps in a predetermined sequence. The sequence is cyclical so once the era reaches the end of the sequence then in the next step it cycles back to the beginning, e.g. from J−1 to 0.

Each way's era E is allowed to run up to K steps ahead of the oldest eras in the set S, where K<J−1 (i.e. K≤J−2). I.e. any given era can run up to step K+O (modulo J) where O is the current step of the oldest era in the set. K is a parameter of the system which may be set to any value by the designer subject only to this constraint.

However, each way's era E is only allowed to run ahead subject to an additional constraint. That is, the era values currently in use by all the ways W in the set S must keep to being a consecutive with one another within in the series.

When a given way W is accessed (either to cache data into the way or retrieve data from it), its era E is incremented by one or more steps in the sequence, unless this would cause one of the above criteria to be breached. I.e. it is not incremented if either of: i) it is already K steps ahead of the current oldest era in the set S, or ii) this would cause it to become non-consecutive with the next youngest era currently within the set.

In embodiments, the incrementing does not always move just one step ahead but rather updates the respective era to be the youngest (newest) era that will not cause an unused era to exist between LRU and MRU (i.e. the youngest era value that will still satisfy the criteria of forming a consecutive run of no more than K steps amongst the ways of the set). I.e. the accessed way becomes MRU, which means, moving its era to the one furthest ahead in the sequence that will still not cause there to be an unused era between MRU and LRU. The rationale behind that is, since the way is being accessed right now, then this now needs to become most recently used way whilst still observing the two restrictions i) & ii) to differentiate MRU from LRU. In alternative embodiments however, the size of the increment could be implemented according to another rule, such as being incremented by a fixed-size increment of one step in the series. This variant would reward frequency of access rather than just how recent the access was. So if a way was recently accessed, but has not been accessed very much in the past, then it would get moved up by only one step in the order, instead of being accelerated to the front.

When all eras E in the set S catch up to one or more step ahead of what was the oldest era, then that era value now becomes the oldest era O.

For instance, in the example of a two-bit era E, there are four possible era values E and only three are needed at any one time. The sequence could be for example 00, 01, 10 and 10, and up to three of these can be in use at any one time (K=2). I.e. the MRU can run ahead of the LRU by up to 2. So if the LRU is at step O, the MRU can be up to step O+K (assuming a modulo J counting space, i.e. wrapping around after J counting steps). E.g. if the LRU is 00, then the MRU can run up to 10 (but not 11). However, if all other eras in the set are currently at 00 for example, then the MRU cannot progress beyond 01.

If a delineating gap of at least one step is needed between the MRU and LRU (i.e. from the MRU in the direction cycling back to the LRU), then that means K is at least two less than J. K is the number of steps ahead that the MRU can run beyond the LRU, i.e. the MRU can be a maximum of O+K where O is the oldest era (again always assuming mod J counting). J is the total number of steps in the series (i.e. total number of possible era values). So in the two-bit era example, the series of era values may be 00, 01, 10, 11 (J=4). Say for example the oldest era O (i.e. LRU) is currently 00. Then the MRU can be up to 10 (but not 11). I.e. up to two steps ahead of O. If it was allowed to go to O+3, i.e. 11, then there would be no gap to delineate between MRU 11 and LRU 00. Hence the first constraint is K<J−1.

The second constraint is that the eras E of all the ways within the set S must be contiguous (i.e. consecutive) between O and O+K (i.e. with no unused steps in between). This guarantees that the memory access controller 26 can distinguish the oldest from the youngest eras while providing more intermediate age information for each way. Once no eras are in step O, the window of available eras has effectively advanced one step and the oldest era becomes O+1.

The above requirements to distinguish between MRU and LRU can also be thought of equivalently in terms of used and unused eras instead of steps (i.e. which possible era values are currently in use and not in use by the actual eras E of all the ways W in the set S). If the era values span three steps (e.g. 00 to 10) in a four-step sequence, then the intermediate step (e.g. 11) is the unused era. There must also be no unused era values existing between LRU and MRU in the direction counting from LRU to MRU. This is required to avoid aliases in which the memory access controller 26 does not have enough information to distinguish LRU from MRU. The requirement is to be only one less than J and keep no unused eras in the middle. In such case, the unused era indicates who is the oldest era (unused+1) and who is the youngest era (unused−1).

Thus it is possible to improve the algorithm by allowing the MRU to run up to two or three era values above the LRU while always keeping the used era values consecutive. The three eras in use will shift once the oldest eras become younger (newer) after a hit or a replacement.

In the case where an era can run two or more steps ahead of the oldest era, as opposed to just one step ahead, the advantage is that the eras of the different ways can take values from amongst a larger range of possible values. This means one can keep more rich information about the relative age of such ways (or more generally partitions), and therefore the "oldest" way (or partition) according to the era value has more chances of being actually the oldest.

In a simple implementation each "step" could corresponded to a respective binary era value in a sequential counting sequence, e.g. 00, 01, 10, 11 in the example of a two bit era E. However in principle any scheme or mechanism could be employed for keeping track of the steps or stages of the era E.

While the above has been described in terms of the ways within a set of a set-associative cache, the algorithm could also be applied for arbitrating between the partitions of any type of cache divided into a plurality of partitions and requiring a policy for eviction of the partitions. For instance, the algorithm could also be applied between the cache lines of a fully-associative cache, and/or in a TLB (translation look-aside buffer). For instance TLBs are usually fully-associative, in at least some of their levels, and are used to store page table entries, whereas general purpose caches are usually way-set associative and are used to cache plain memory contents. The disclosed techniques could apply to either or both of these, or other types of cache.

Further, while the above has been described in terms of processors with caches and cache controllers, the era algorithm could equally be usable in any scenario in which a victim needs to be selected among a group of candidates where age information may be useful to select a proper candidate. This includes branch predictors and other structures in a processor, or any other kind of electronic device or data storage device requiring temporary storage of data amongst a finite partitions.

In the case of a processor, the processor may for example take the form of a CPU (central processing unit), GPU (graphics processing unit), VPU (vision processing unit), TPU (tensor processing unit), NPU (neural processing unit), PPU (physics processing unit), DSP (digital signal processor), ISP (image signal processor), SPU or SPE (synergistic processing unit element), or any other type of application specific processor or accelerator processor, or a FPGA (field-programmable gate array) such as a FPGA sound chip.

The algorithm may be implemented in dedicated hardware circuitry of the memory access controller 26, or may be partially or wholly implemented in software or firmware.

Figure 4:
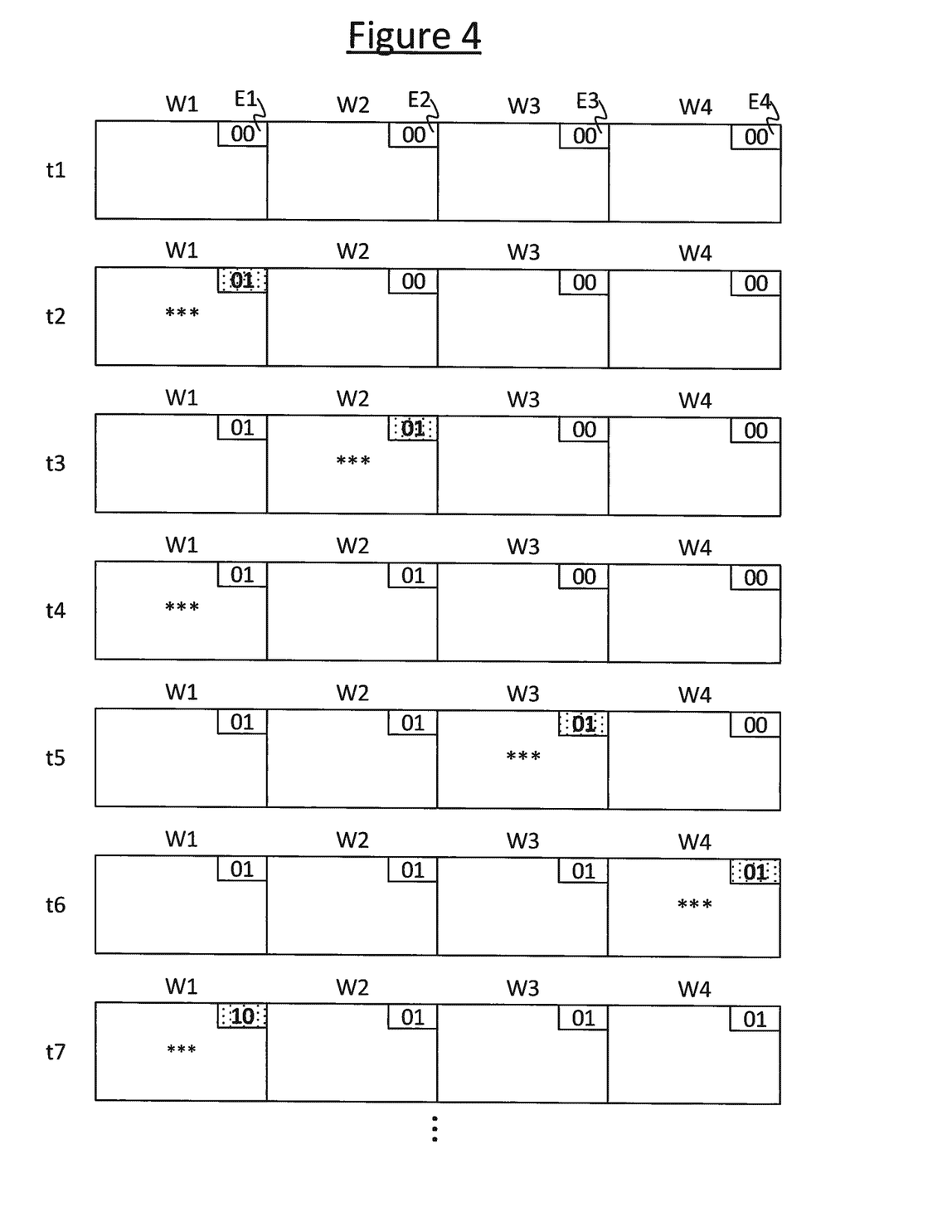
FIG. 4 schematically illustrates operation of an example cache eviction algorithm, and FIG. 5 schematically illustrates another example of a cache eviction algorithm.

By way of illustration, FIG. 4 shows a process flow for the case of a four-way set-associative cache where J=4 and K=1 in an example use scenario.

At a first time t1 the eras E1 . . . 4 of all the ways W1 . . . 4 in a given set S are initialized to 00, i.e. so all have "least recently used" (LRU) status. At a second, subsequent time t2, some data is to be cached. The memory access controller 26 can select any of the ways W1 . . . 4 in the set to use to cache the data at this stage since all currently have "least recently used" (LRU) status. Note therefore that LRU status is not exclusive (there can happen to be more than one "least" recently used way W at any given time). In embodiments there could be a predetermined rule for which order to fill the ways W from amongst the LRU ways, or alternatively they could be selected at random from amongst the available LRU ways. This is an implementation option.

In the illustrated scenario, the data is cached into a first way W1 in the set. This is one form of access to the way W1, and so in response the respective era E1 is updated to 01, to give it "most recently used" (MRU) status. In the illustration, three asterisks (***) are used to symbolize an access operation to a particular way W, and a bold era value with background pattern is used to symbolize an update to the respective era value.

At a third time t3 subsequent to t2, another piece of data is to be cached. For this the memory access controller 26 can select to use any of the LRU ways W2 . . . 4 in the set (again either using a predetermined rule to select among them or selecting at random from among the LRU ways, depending on implementation). LRU status means the oldest era value, so at this stage that is 00. In the illustrated scenario, the data is cached into a second way W2 in the set. In response, the respective era E2 is updated to 01, so that it also now has MRU status. Two ways now have MRU status and two others (W3 and W4 in this scenario) still have LRU status. Note therefore that MRU status is not exclusive (there can happen to be more than one "most" recently used way W at any given time).

Then at time t4 subsequent to t3, the data is requested from the first way W1. This is also a form of access to the way W1. However, since the respective era E1 is already one step ahead of the oldest era 00 (remembering that K=1), then the respective era E1 is not updated in response to this access.

At time t5 subsequent to t4, there is another piece of data to cache. The memory access controller 26 selects one of the two remaining LRU ways for this (again either according to a predetermined rule or randomly in order to select which of the two). In the illustrated scenario, it uses a third way W3, and updates the respective era E3 to 10 accordingly.

At time t6 subsequent to t5, there is yet another piece of data to cache. The memory access controller 26 selects the only remaining LRU way for this, i.e. the fourth way W4 in the illustrated scenario. It also updates the respective era value E4 to 10 accordingly.

Note: all the ways W1 . . . 4 in the set now have the same era value. This now becomes the new LRU era value. The next caching operation to occur, the memory access controller 26 can again now select to use any of the ways (and again this could be done according to a predetermined rule or randomly, depending on implementation).

At time t7, there is another access to the first way W1. This could be either an operation to cache a new piece of data in W1 or to retrieve the previously cached data from W1. Because the oldest era value is now 10, the era E1 of way W1 is now be updated to 10 to reflect the access.

When the next piece of data needs to be cached at a time following t7, the memory access controller 26 can now again select to use any of the remaining LRU ways W2 . . . 4 in the set (again either according to a predetermined rule or randomly to select among the remaining LRU ways, depending on implementation).

The process continues in a similar manner with each successive cache access operation.

Figure 5:
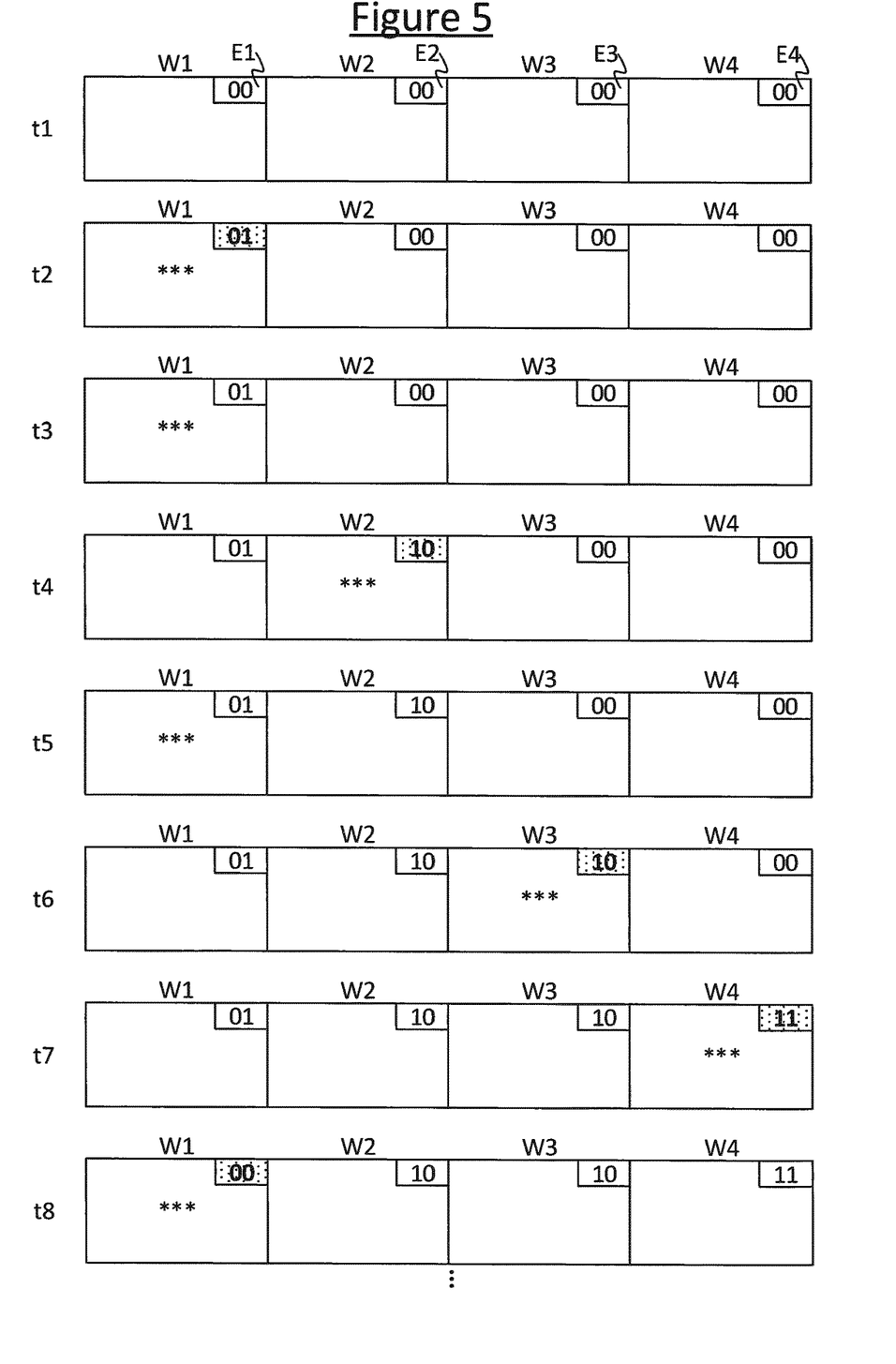

FIG. 5 illustrates a variant of the above-described process where J=2, instead of J=1. That is, the MRU can run up to two steps ahead of the LRU instead of one.

In the example use scenario illustrated, the process begins in the same manner as FIG. 4 up to and including time t2.

At a subsequent time t3, there is then an access to the first way W1 to retrieve the cached data therefrom. In this implementation the era of a way is allowed to run up to K=2 steps ahead of the LRU (the LRU currently being 00 at time t3). Alone this constraint would allow the era of way W1 to be incremented to 10. However, at the present time t3 this is prevented by the second constraint. If the era of W1 was allowed to move to 10 at this stage, then the eras in use from LRU to MRU would be non-consecutive, and then it would not be possible to tell who is LRU and who is MRU. The reason would be because of the alias that would exist between the used eras 00, 10 and the unused eras 01, 11. The reader knows the history of the era values because it described here, but the hardware does not, it can only see the information encoded in the eras. In this situation, the hardware would not know whether the unused era 00 or the unused era 10 marks the separation between MRU and LRU.

At time t4 subsequent to t3, a piece of data is cached to the second way W2. In response its respective era E2 is incremented to 10, giving it the newest (furthest ahead) value in the set. This is allowed because it is no more than K=2 steps ahead of the current oldest era value (LRU) 00, and the current era value 01 of W1's era makes a consecutive run of era values 00, 10, 10 amongst the eras in the set S.

At time t5 subsequent to t4, say then there is another access to the first way W1 to retrieve the cached data from W1 again. Ideally its respective era E1 would be made younger (newer, i.e. furthest ahead in the cycle) than anyone else, i.e. 11. However that would take it beyond the longest allowed distance from the LRU (K=2). Also, any increment at all would still result in a non-consecutive run from LRU to MRU, since W3 and W4's eras are still at 00. Therefore W1's era remains unchanged.

At time t6 subsequent to t5, a piece of data is then cached to the third way W3 for the first time since initialization at t1. In response its respective era E3 is updated to 10. Ideally it would be made younger (newer, i.e. further ahead in the cycle) than anyone else, i.e. 11, but that would take it beyond the longest allowed distance from the LRU, so instead its age is set to match that of W2—i.e. the youngest value that still meets the two constraints of remaining consecutive and being no more than K steps ahead of the LRU value.

Then at time t7 subsequent to t6, a piece of data is then cached to the fourth way W4 for the first time since initialization at t1. In response its respective era E4 is updated to 11. This is allowed because now the LRU will be 01 (the current era of W1), and W4's new era will be no more than K=2 steps ahead of this, and will form a consecutive run of era values with W2 and W3's era value of 10 in the middle of the run.

At time t8 subsequent to t7, there is yet another access to the first way W1 to retrieve the cached data therefrom. In response its respective era E1 is updated to 00. This is allowed because now the LRU will be 10 (the current era of W2 and W3), and W1's new era will be no more than K=2 steps ahead, and form a consecutive run with W4's era value of 11 in the middle. Note that since the sequence of possible era values is cyclical, i.e. wrap-around, the furthest ahead value is now 00.

The process continues in a similar manner with each successive cache access operation.

It will be appreciated that the above embodiments have been described by way of example only.

More generally, according to one aspect disclosed herein, there is provided device comprising: storage comprising a group of partitions, and a controller operable to place data into a selected one of the partitions, and to evict existing data from the selected partition when already occupied. Each of the partitions has a respective associated age indicator, and the controller is configured to select said one of the partitions according to an eviction policy as follows. Each age indicator is operable to cycle through a sequence of J steps. Each age indicator is allowed to run ahead of the current step O of an oldest age indicator in the group subject to constraints that: i) each age indicator is allowed to run up to, but no more than, K steps in the series ahead of O where K<J−1, but ii) the age indicators of all the partitions in the group must, between them, always continue to form a run of consecutive steps in the series, wherein the oldest age indicator is that of the partition that was least recently accessed amongst the partitions in the group. When one of the partitions in the group is accessed, its respective age indicator is incremented by an increment of one or more steps in the series if it will satisfy both said constraints i) and ii) after the incrementation, but otherwise the respective age indicator remains unchanged, wherein said increment is sized such that the run still meets both said constraints i) and ii) after the incrementation. The selected partition for eviction is one of the partitions in the group with age indicator currently at step O.

In embodiments, the device may take the form of a processor, further comprising: an execution unit, and a memory. Said storage may be a cache, and the controller may be a memory access controller arranged to load data into the execution unit in response to instructions executed by the execution unit. In this case the memory access controller performs said loading by accessing the data from the cache when the data is available in the cache and from memory when not, said placing of data into the cache comprising caching the data into the selected partition of the cache when loaded from memory.

In some such embodiments, the cache may be divided into a plurality of sets and each set may be subdivided into a plurality of ways, each set being associated with a different respective address range and said data being data from the address range associated with one of the sets. In this case said group may be said one of the sets and said partitions may be the ways within that set. E.g. there may be four ways per set.

In embodiments, said increment sets respective age indicator to the furthest possible step ahead in the series that, after the increment, still keeps the run to no more than K consecutive steps.

In other words, the controller is configured to select said one of the partitions according to an eviction policy whereby:
the age indicators in the group can each cycle through a sequence of J steps, subject to a condition that the age indicators of all the partitions in the group must, between them, remain consecutive and never form a run of more than K consecutive steps where K<J−1, and
when one of the partitions in the group is accessed, its respective age indicator is set to the furthest possible step ahead in the series that still meets said condition.

In alternative embodiments however, said increment may be a fixed-size increment of one step in the series.

In embodiments, said series of steps may be a series of sequential binary values. In embodiments, said series may start with the value zero.

In an example implementation J=4.

In embodiments said binary values may be represented with only two bits. E.g. said series may be 00, 01, 10, 11.

In an example implantation K=1. In another example K=2 or 3.

In one particular example implementation J=4 and K=1.

In embodiments the device may be built from a superconducting logic architecture for use at cryogenic temperatures. For instance said superconducting logic architecture may be reciprocal quantum logic.

According to another aspect disclosed herein, there is provided a system comprising: the processor of any embodiment disclosed herein built using a superconducting logic architecture; a topological quantum computing device or other superconductivity device comprising superconductivity components, and a cryogenic cooling chamber in which the processor and said device are enclosed, arranged to cool the device to a temperature at which the superconductivity components exhibit superconductivity behaviour; wherein the processor is arranged to interface between the device and an external computer external to the chamber.

According to another aspect disclosed herein, there may be provided a method of implementing an eviction algorithm for storage comprising a group of partitions wherein each partition has a respective associated age indicator operable to cycle sequentially through a series of J steps. The eviction algorithm comprises: allowing each age indicator to run ahead of the current step O of an oldest age indicator in the group subject to constraints that: i) each age indicator is allowed to run up to, but no more than, K steps in the series ahead of O where K<J−1, but ii) the age indicators of all the partitions in the group must, between them, always continue to form a consecutive run of steps in the series, wherein the oldest age indicator O is that of the partition that was least recently accessed amongst the partitions in the group. When one of the partitions in the group is accessed and its respective age indicator will still satisfy both said constraints i) and ii), incrementing its respective age indicator by an increment of one or more steps in the series. But when one of the partitions in the group is accessed and its respective age indicator will not satisfy both said constraints i) and ii) if incremented (by even one step), then the respective age indicator remains unchanged. The selected partition for eviction is one of the partitions in the group with age indicator currently at step O.

In embodiments the method may further comprise operations corresponding to any of the device or system features disclosed herein.

Other variants or use cases of the disclosed techniques may become apparent to the person skilled in the art once given the disclosure herein. The scope of the disclosure is not limited by the described embodiments but only by the accompanying claims.

The invention claimed is:

1. A device comprising:
 storage comprising a group of partitions, and
 a controller operable to place data into a selected one of the partitions, and to evict existing data from the selected partition when already occupied;
 wherein each of the partitions has a respective associated age indicator, and the controller is configured to select said one of the partitions according to an eviction policy whereby:
 each age indicator is operable to cycle through a sequence of J steps in a cyclical manner, such that, when starting from an initial value, after cycling through J steps the age indicator again indicates the initial value, wherein said sequence of steps is a series of sequential binary values, and wherein said binary values are represented with at least two bits;
 each age indicator is allowed to run ahead of a current step O of an oldest age indicator in the group subject to constraints that: i) each age indicator is allowed to run up to, but no more than, K steps in a series ahead of O where K<J−1, but ii) the age indicators of all the partitions in the group must, between them, always continue to form a run of consecutive steps in the series, wherein the oldest age indicator is that of the partition that was least recently accessed amongst the partitions in the group;

when one of the partitions in the group is accessed, its respective age indicator is incremented by an increment of one or more steps in the series if it will satisfy both said constraints i) and ii) after the incrementation, but otherwise the respective age indicator remains unchanged, wherein a number of steps of said increment is such that the run still meets both said constraints i) and ii) after the incrementation; and the selected partition for eviction is one of the partitions in the group with age indicator currently at step O.

2. The device of claim 1, wherein the device includes a processor, further comprising:

an execution unit, and a memory, wherein said storage is a cache, and the controller is arranged to load data into the execution unit in response to instructions executed by the execution unit, by accessing the data from the cache when the data is available in the cache and from memory when not, placing data into the cache comprising caching the data into the selected partition of the cache when loaded from memory.

3. The device of claim 2, wherein the cache is divided into a plurality of sets and each set is subdivided into a plurality of ways, each set being associated with a different respective address range and said data being from the address range associated with one of the sets, said group being said one of the sets and said partitions being the ways within that set.

4. The device of claim 3, wherein there are four ways per set.

5. The device of claim 3, wherein said increment sets the respective age indicator to the furthest possible step ahead in the series that, after the increment, still keeps the run to no more than K consecutive steps.

6. The device of claim 1, wherein said increment sets the respective age indicator to the furthest possible step ahead in the series that, after the increment, still keeps the run to no more than K consecutive steps.

7. The device of claim 5, wherein said series starts with the value zero.

8. The device of claim 5, wherein J=4.

9. The device of claim 8, wherein said binary values are represented with only two bits.

10. The device of claim 9, wherein K=1.

11. The device of claim 1, wherein K=1.

12. The device of claim 9, wherein K=2.

13. The device of claim 1, wherein K=2 or 3 or wherein J=4 and K=1.

14. The device of claim 2, wherein the processor is built from a superconducting logic architecture for use at cryogenic temperatures and said superconducting logic architecture is reciprocal quantum logic.

15. A method of implementing an eviction algorithm for storage comprising a group of partitions wherein each partition has a respective associated age indicator operable to cycle sequentially through a series of J steps in a cyclical manner, such that, when starting from an initial value, after cycling through J steps the age indicator again indicates the initial value, wherein said sequence of steps is a series of sequential binary values, and wherein said binary values are represented with at least two bits, the eviction algorithm comprising:

allowing each age indicator to run ahead of a current step O of an oldest age indicator in the group subject to constraints that: i) each age indicator is allowed to run up to, but no more than, K steps in a series ahead of O where K<J−1, but ii) the age indicators of all the partitions in the group must, between them, always continue to form a consecutive run of steps in the series, wherein the oldest age indicator O is that of the partition that was least recently accessed amongst the partitions in the group;

when one of the partitions in the group is accessed and its respective age indicator will still satisfy both said constraints i) and ii), incrementing its respective age indicator by an increment of one or more steps in the series; and when one of the partitions in the group is accessed and its respective age indicator will not satisfy both said constraints i) and ii) if incremented, then the respective age indicator remains unchanged, wherein a selected partition for eviction is one of the partitions in the group with age indicator currently at step O.

16. The method of claim 15, further comprising loading data into an execution unit in response to instructions executed by the execution unit by accessing the data from a cache when the data is available in the cache and from memory when not, placing data into the cache comprising caching the data into the selected partition of the cache when loaded from memory.

17. The method of claim 16, wherein the cache is divided into a plurality of sets and each set is subdivided into a plurality of ways, each set being associated with a different respective address range and said data being data from the address range associated with one of the sets, said group being said one of the sets and said partitions being the ways within that set.

18. The method of claim 17, wherein there are four ways per set.

19. The method of claim 15, wherein said incrementing sets the respective age indicator to the furthest possible step ahead in the series that, after the increment, still keeps the run to no more than K consecutive steps.

20. The method of claim 15, wherein J=4 and K=1.

* * * * *